(12) United States Patent
Lorenz

(10) Patent No.: US 7,455,327 B2
(45) Date of Patent: Nov. 25, 2008

(54) COUPLING DEVICE

(75) Inventor: Sven Lorenz, Hassfurt/Sylbach (DE)

(73) Assignee: Frankische Rohrwerke Gebr. Kirchner GmbH & Co. KG (DE)

( * ) Notice: Subject to any disclaimer, the term of this patent is extended or adjusted under 35 U.S.C. 154(b) by 104 days.

(21) Appl. No.: 11/314,448

(22) Filed: Dec. 20, 2005

(65) Prior Publication Data

US 2006/0165479 A1 Jul. 27, 2006

(30) Foreign Application Priority Data

Dec. 23, 2004 (DE) .................... 10 2004 062 207

(51) Int. Cl.
*F16L 37/00* (2006.01)
*F16L 39/00* (2006.01)
(52) U.S. Cl. ...................... 285/308; 285/319
(58) Field of Classification Search ................ 285/308, 285/319, 320, 321
See application file for complete search history.

(56) References Cited

U.S. PATENT DOCUMENTS

| | | | |
|---|---|---|---|
| 1,484,807 A | | 2/1924 | Baker et al. |
| 4,804,213 A | * | 2/1989 | Guest .......................... 285/308 |
| 4,954,004 A | * | 9/1990 | Faber et al. .................... 403/13 |
| 5,536,047 A | | 7/1996 | Detable et al. |
| 5,782,502 A | * | 7/1998 | Lewis .......................... 285/87 |
| 6,082,779 A | * | 7/2000 | Lesser et al. ................... 285/93 |
| 6,086,119 A | * | 7/2000 | Hansel ........................ 285/309 |
| 6,089,616 A | * | 7/2000 | Trede et al. .................... 285/93 |
| 6,254,145 B1 | * | 7/2001 | Schwarz et al. ............. 285/319 |
| 6,318,764 B1 | * | 11/2001 | Trede et al. .................. 285/305 |
| 6,371,529 B1 | * | 4/2002 | Szabo et al. ................. 285/319 |
| 7,029,036 B2 | * | 4/2006 | Andre ......................... 285/319 |
| 7,178,837 B2 | * | 2/2007 | Yoshino ...................... 285/305 |
| 2003/0094813 A1 | * | 5/2003 | Bucher et al. ............... 285/319 |
| 2003/0173780 A1 | * | 9/2003 | Detable et al. .............. 285/308 |
| 2004/0094958 A1 | * | 5/2004 | Treverton et al. ........... 285/319 |
| 2004/0189001 A1 | * | 9/2004 | Poder .......................... 285/93 |
| 2005/0179258 A1 | * | 8/2005 | Brandt et al. ................ 285/308 |
| 2005/0218650 A1 | * | 10/2005 | Pepe et al. ................... 285/308 |

FOREIGN PATENT DOCUMENTS

| | | |
|---|---|---|
| DE | 43 00 037 C1 | 4/1997 |
| EP | 0 575 865 A | 12/1993 |
| EP | 0 756 125 A1 | 1/1997 |

* cited by examiner

*Primary Examiner*—James M Hewitt
(74) *Attorney, Agent, or Firm*—Michaud-Duffy Group LLP

(57) ABSTRACT

A coupling device with a housing (12) and a locking element (11, 11') for receiving a cylindrical connecting element (18, 18a), whereby an operating element (30) for the releasing of the locking element is accessible by way of an opening in the housing (12, 12') and whereby the locking element (11, 11') includes at least one holding portion (26), whereby the locking element (11, 11') includes a first spring arm (20) with a holding portion (26) which arm extends from the operating element (30) all the way to a wall of the housing (12, 12') opposite the operating element, whereby the spring arm (20) is constructed at the opposite wall with a joint portion (24). Alternatively, there are two spring arms with joint ends that engage each other.

15 Claims, 4 Drawing Sheets

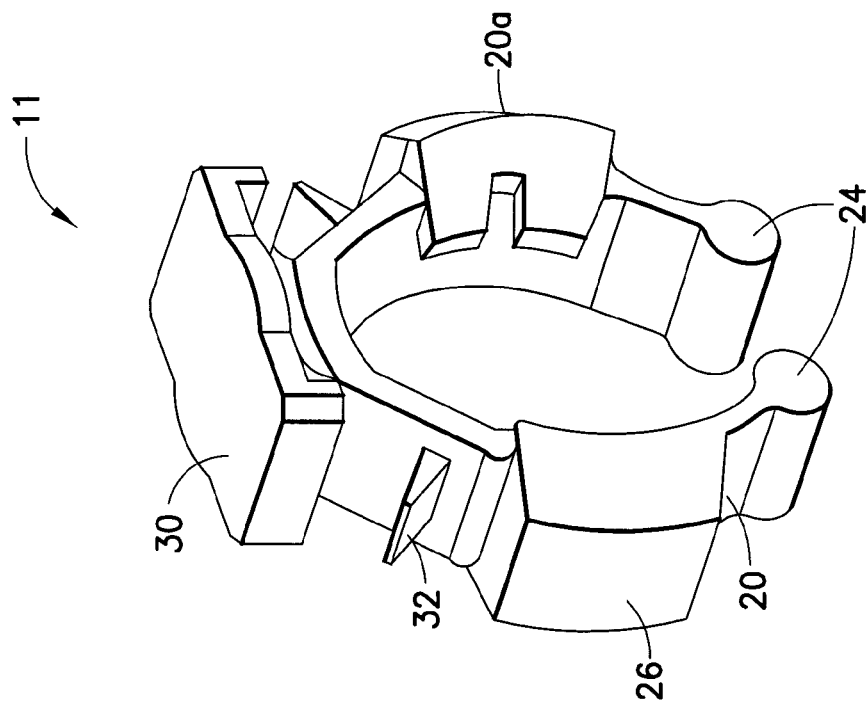
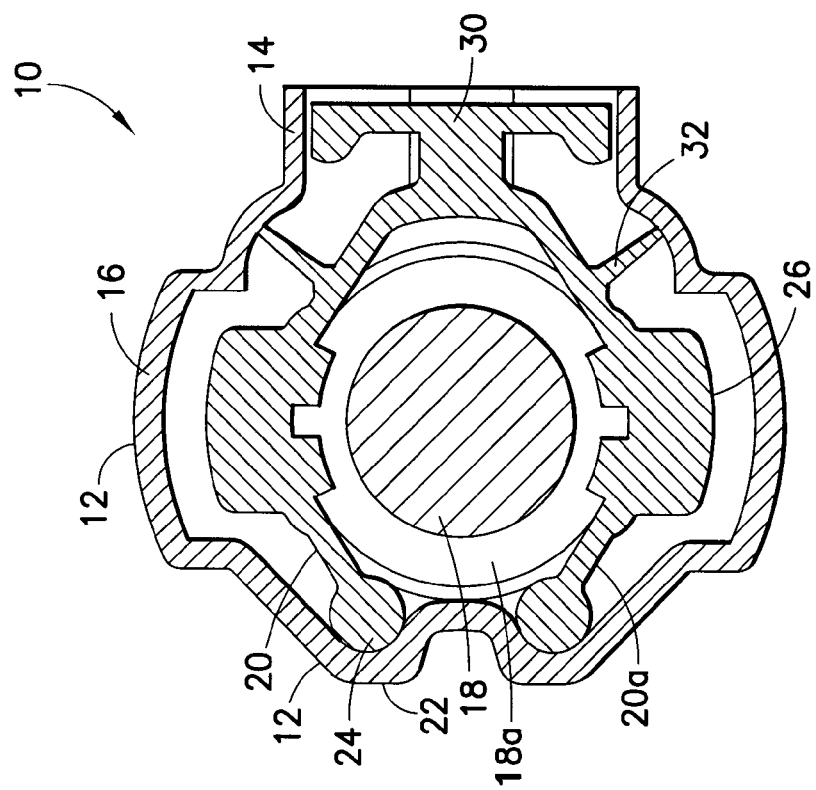
FIG. 1a
FIG. 1

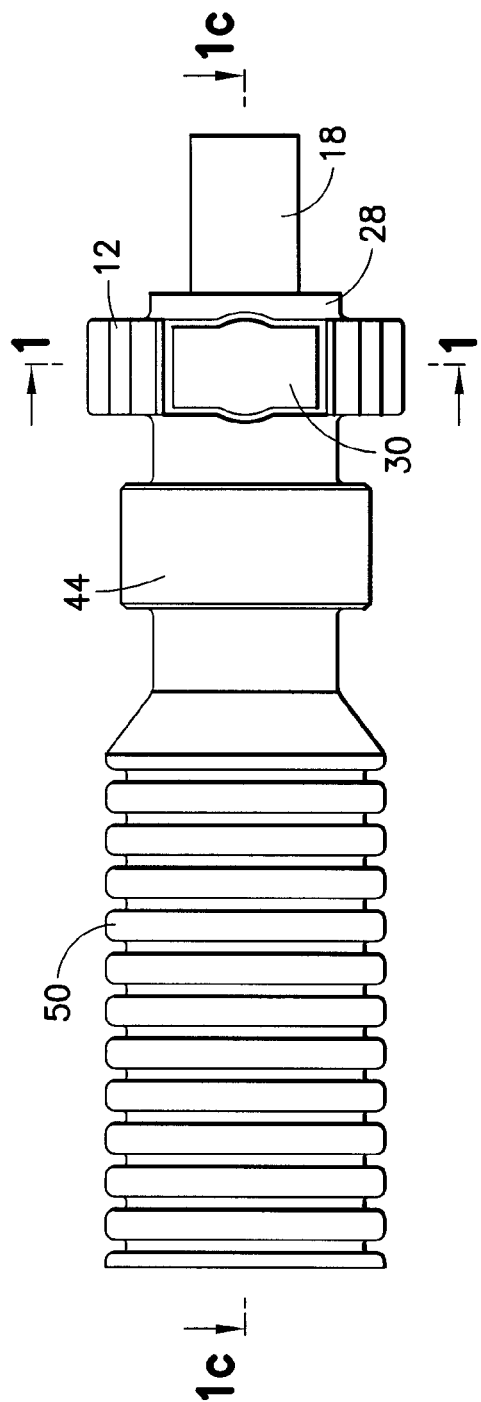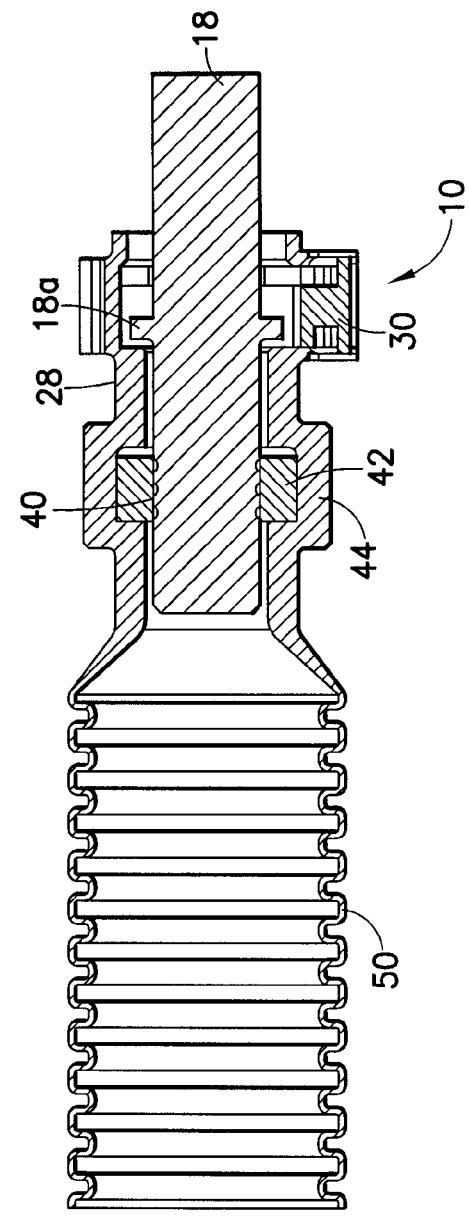

COUPLING DEVICE

FIELD OF THE INVENTION

The invention relates to a coupling device with a housing and a locking element for receiving a cylindrical connector element, especially a pipe union or the like, whereby an actuator element for the unlocking of the locking element is accessible through an opening in the housing and whereby the locking element has at least one holding portion.

BACKGROUND ART

Such coupling devices or fluid connectors are already known in the art. For example, if a connecting conduit, especially a corrugated pipe or the like is to be reversibly connected with its union onto a connecting element, corresponding reversible connectors are used in order to connect the connecting union of the pipe to a corresponding connecting portion.

A connector for pipes is known, for example, from EP 0 756 125 A1, wherein spring arms with stop shoulders which extend in the actual direction of the connector grip behind a corresponding holding ring on the connecting element and thereby hold the connecting element. This type of connector provides difficulties when the connecting element is to be separated from the connector. An additional ring can be provided for the opening of the connector, whereby this ring when forced in axial direction into the connector forces the arms radially outwardly to free the holding ring of the connecting portion. However, an undesired axial movement of the additional ring for the releasing or opening of the connector can lead to an unintended release of the connecting element.

A corresponding, much more complicated coupling connector is also known from DE 43 00 037 C1, whereby in that connector V-shaped spring arms have holding portions therebetween which are moved in guides radially outward by a radial compression of both V-shaped spring portions in order to accept a grip behind portion of a connecting element. After release of the V-shaped spring portions, the holding portions once again move radially inward and grip behind the grip behind section of the connecting element. This connector also depends solely on the flexibility of the locking element and at low temperatures when the plastic from the which the locking element is made becomes hard, the spring elements can break or it becomes relatively difficult to operate the spring elements of the lock element.

SUMMARY OF THE INVENTION

It is an object of the present invention to provide a coupling device which does not have the above-mentioned disadvantages. In particular, a coupling device is to be provided wherein the flexibility of the material of the locking element is not solely determinative.

According to the invention, the stated objects are at least partially achieved with a coupling device having a housing and a locking element for receiving a cylindrical connecting element. An operating element for releasing the locking element is accessible by way of an opening in the housing. The locking element includes at least one holding portion and a spring arm with a holding portion. The spring arm extends from the operating element to a housing wall opposite the operating element. The spring arm is constructed at the opposite wall with a joint portion.

The advantages achievable in accordance with the invention are based on the locking element having a first spring arm with a holding portion which extends from the operating element up to a wall of the housing opposite the operating element, whereby the spring arm is provided with a joint portion close to or at the opposite wall.

By using a joint portion, especially in the form of a ball and socket joint, it is possible to perform at least part of the required work for the operation of the locking element by way of the joint portion.

The joint portion is preferably housed at the opposite wall in a joint socket. This means that when the joint portion is provided in the shape of a ball and socket joint, the joint ball is at least partially received in a spherical recess on the opposite wall. However, the joint portion can also be constructed differently, for example in that the end of the spring arm is not spherically shaped, but only is a dull end of a rod or the like, which can nevertheless roll off on the opposite wall of the housing upon operation of the spring arm in order to provide the required movements or degrees of freedom so that a coupling or uncoupling operation can be carried out.

According to a further embodiment, it is possible to provide a second spring arm mirror symmetrical to the first spring arm, whereby the further, second spring arm at its end close to the opposite wall can have a joint socket for the joint portion of the first spring arm. In this manner, the joint socket can be provided on a further, second spring arm independent from the construction of the housing. The ends of the two spring arms used can thereby in a preferred embodiment be constructed as a complete ball and socket joint.

According to a further preferred embodiment, another second spring arm can be provided which is mirror symmetrical to the first spring arm, whereby the other second spring arm has a joint portion which is received in the joint socket at the opposite wall of the housing. A ball and socket type construction or any other joint construction as described above can be provided for this joint type construction.

A guide device for the operating element is provided in the housing in order to prevent a jamming of the operating element in the housing. For example, when the operating element is constructed as an operating button, the guide device can be constructed as a guide channel or duct, which can guide the operating element without jamming.

To better control and align the deformation or deflection of the spring arms of the embodiments according to the invention, the spring arm or arms can be provided with pivotable sections. These pivotable sections, for example, can be in the form of a rocker or lever to provide that upon operation of the operating element the deflection or deformation of the springs arms is carried out in a well defined manner. Any further guides for the spring arms are obviated in this manner, since the pivotable portions provide for a defined deflection and guiding of the spring arms and, therefore, their holding portions.

The housing preferably includes one or more free movement portions. These free movement portions serve to receive the holding portions when the spring arms are deflected or deformed in order to let a connecting element with its holding ring move past. With this embodiment, it is possible to make the housing of the coupling device in accordance with the invention smaller with less material cost, since a larger sizing of the housing is only necessary at those locations where a larger clearance for free movement is required.

BRIEF DESCRIPTION OF THE DRAWINGS

The present invention will be further described in the following by way of two preferred embodiments with reference to the attached drawings. Further features, goals and advantages according to the invention are thereby disclosed. The drawings show in:

FIGS. 1 to 1c: A first embodiment of the invention whereby FIG. 1 is a cross-section through a coupling device, FIG. 1a shows a coupling device in perspective, FIG. 1b is a top view of a connecting conduit with pipe union and locking device and FIG. 1c is a partial axial section through the pipe union according to FIG. 1b; FIG. 2 shows a cross-section through a coupling device according to a second embodiment of the invention, FIG. 2b is a view a connecting conduit and coupling device according the invention and FIG. 2c shows the view according to FIG. 2b but in partial axial longitudinal section.

DETAILED DESCRIPTION

Figure 2A:
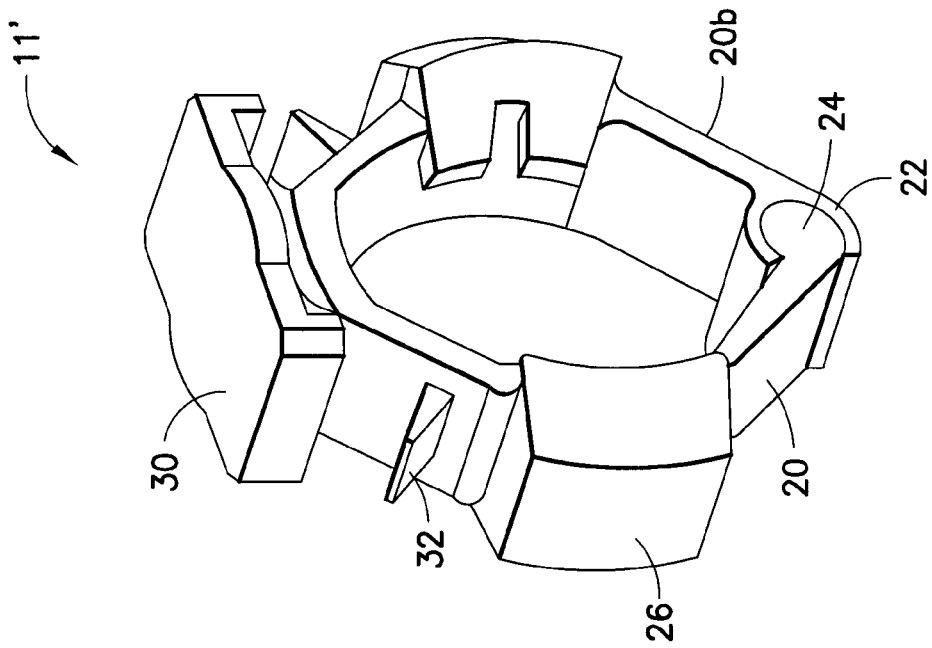
FIG. 2a is a perspective view of a locking element according to the invention.

Portions which are equal or at least have the same function are referred to by using the same or corresponding reference numbers in the drawings. A repeated description of the same or corresponding elements is thereby obviated.

A first embodiment of a coupling device is referred to in general by reference no. 10 in FIG. 1. The coupling device 10 includes a housing 12 and a locking element 11 within the housing 12.

The housing 12 includes a guide section or guide channel 14, which is open to the outside so that an operating element 30 of the locking element 11 is accessible from the outside and can be guided within the guide channel 14. One or more portions for free movement 16 are provided in order to provide sufficient clearance upon operation of the locking element so that an opening operation can be carried out.

The housing 12 furthermore includes a joint socket 22 opposite the guide channel 14, whereby in the illustrated embodiment according to FIGS. 1 to 1c two joint sockets 22 are provided to support or partially receive a joint portion 24 of two spring arms 20, 20a.

The locking element 11 includes the operating element 30 and two separate spring arms 20, 20a, namely a first spring arm 20 and a second further spring arm 20a. A holding portion 26 is associated with each of the spring arms 20, 20a, which can grip behind a grip behind section 18a of a connecting element 18. Joint portions 24 are respectively provided at the respective ends of the spring arms 20, 20a. The joint portions 24 and the joint sockets 22 form ball and socket joint like devices in this case. The first spring arm 20 and possibly also the second spring arm 20a include pivotable portions 32 which provide for a controlled deformation or deflection of the spring arms, and therefore also the holding portions 26 on the spring arms, upon operation of the operating element 30, so that a controlled release of the grip behind section 18a of the connecting element 18 can be reproducibly achieved. Conversely, a controlled and reproducible return movement of the holding portion 26 or the spring arms 20, 20a is also promoted by these pivotable portions 32. However, the pivotable portions 32 are only advantageous and not absolutely necessary for a reversible and controlled deflection of the holding portions 26.

When pressure is exerted on the operating element or the operating button 30, the joint portions 24 are respectively rotated relative to and in their joint sockets 22, whereby the holding portions 26 are deflected radially outwardly. The pivotable portions 32 which are associated with specific guide radii at the housing, promote the radially outwardly directed deflection of the holding portions 26. The holding portions 26 are deflected far enough outward so that they let the grip behind section 18a of the connecting element 18 go past. Subsequently, the radially inwardly directed pressure on the operating element is reduced, which means the operator no longer exerts pressure by way of one or more fingers or a tool, so that through the resilient force of the spring arms 20, 20a, the holding portions 26 are moved radially inward in order to grip behind the grip behind section 18a and to safely retain the connecting element 18.

The locking element 11 is illustrated once more in perspective view in FIG. 1a, whereby the open, U-shaped construction of the locking element is better visible.

A connecting conduit 50 with a union portion 28 is apparent from FIG. 1b, whereby the coupling device is provided in the region of the union portion 28, the housing 12 of which is apparent. The operating element 30 can be seen in plan view and the coupled connecting element protrudes from the pipe union 28.

An additional holding portion 44 is also apparent, which can be but need not be provided. An additional holding force and possibly a sealing effect can be generated by way of this additional holding portion 44.

It is apparent from the illustration according to FIG. 1b, that FIG. 1 corresponds to a section B-B while the illustration according to FIG. 1c corresponds to a section A-A of FIG. 1b.

The location of the grip behind section 18a within the coupling device or the connector according to this embodiment of the invention is apparent from FIG. 1c. The corrugated pipe portion 50 of the conduit merges with the receiving portion or union 28. The union 28 apart from the coupling device additionally includes the additional holding portion 44 which can include a holding ring 42, for example in the form of a circlip or the like. A tooth portion 40 of the connecting element 18 can generate an additional holding force in axial direction which counteracts a ripping out of the connecting element 18.

Furthermore, the ring 42 can be provided with a sealing material, such as rubber or the like. In that case, the ring 42 can generate a sealing effect in connection with the toothing or a seal structure 40 on the connecting element 18.

The tube or corrugated tube is constructed integral or in one piece with the coupling device. The tube or corrugated tube 50 is manufactured in a corrugator together with the coupling device and especially its housing 12, so that the coupling device in accordance with the invention need not be separately connected with the tube or corrugated tube 50.

Figure 2:
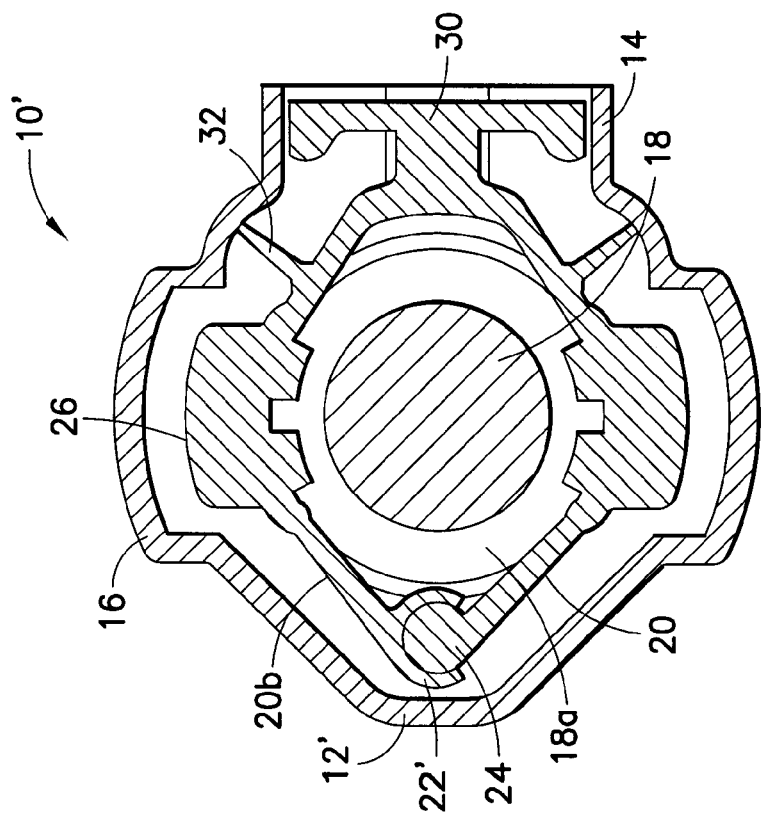
FIGS. 2 to 2c: A second embodiment according to the invention, whereby
Figure 2B:
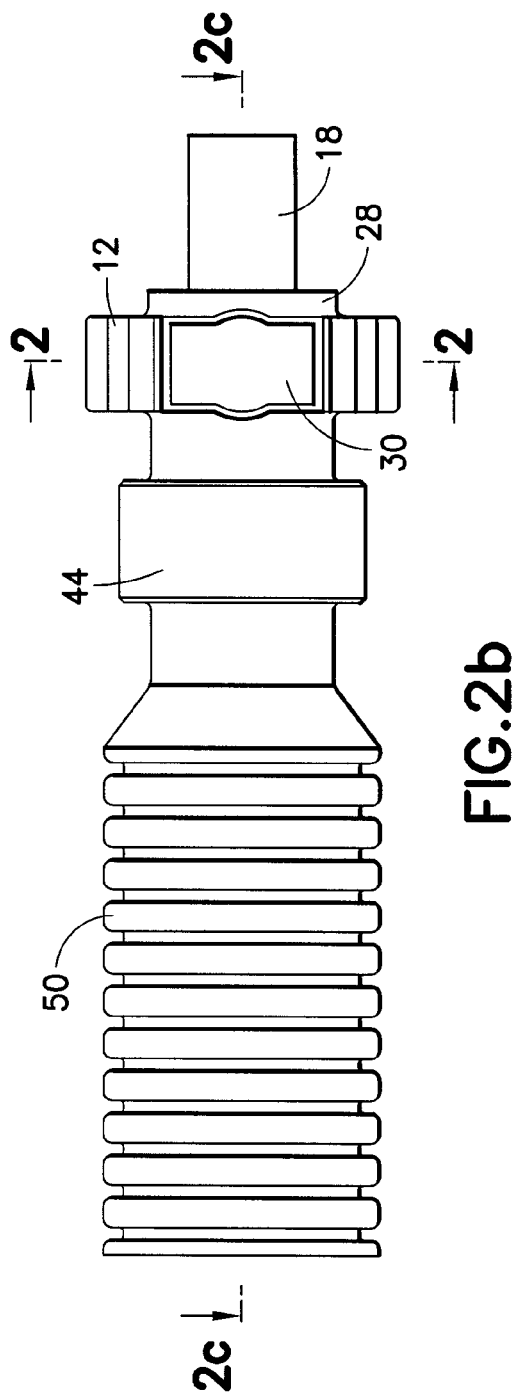
Figure 2C:
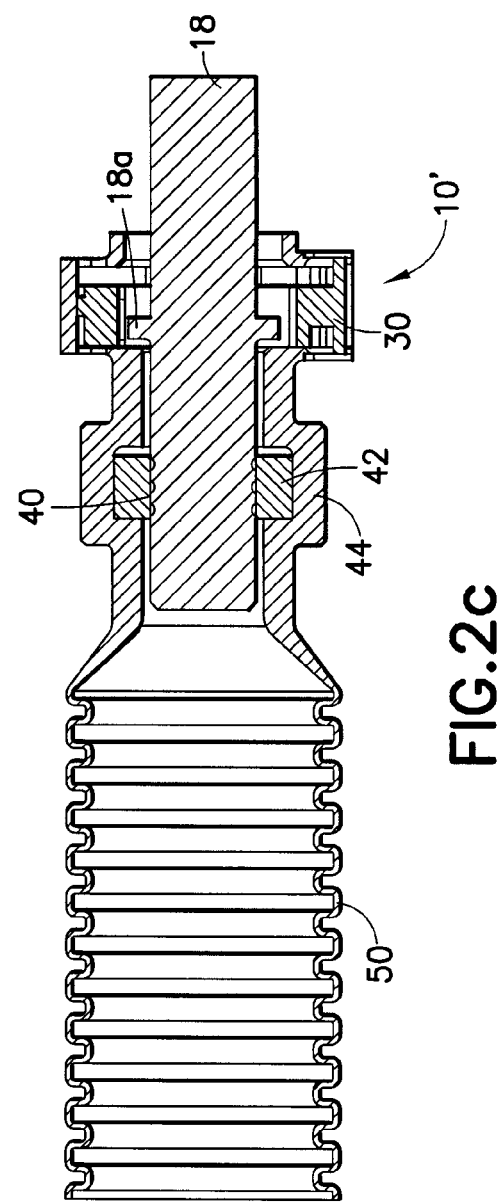

The embodiment according to FIGS. 2 to 2c represents a further coupling device 10' with features according to the invention.

In contrast to the embodiments according to FIGS. 1 to 1c, a joint ball is here provided on one spring arm, the first spring arm 20, while a joint socket 22' for the joint ball 24 is provided on another spring arm, the other, second spring arm 20b. The joint socket 22' can, but need not be supported on the wall of the housing 12' opposite the operating element 30.

Upon exertion of a radially inwardly directed force on the operating element 30, the joint ball 24 rotates within the joint socket 22' and the holding portions 26 on the spring arms 20, 20b are radially outwardly deflected. The connecting element with its gripping behind portion 18a can now be slid through the opened locking element 11'. Subsequently, the operating element 30 is released and the resetting force of the spring arms 20, 20b leads to a closing of the locking element 11'. The grip behind section 18a can now, blocked by the holding portions 26, no longer be pulled out of the coupling device 10'.

I claim:

1. A coupling device comprising:
   a housing; and
   a locking element for receiving a cylindrical connecting element, wherein:
   an operating element for releasing the locking element is accessible by way of an opening in the housing;
   the locking element includes at least one holding portion
   the locking element includes a first spring arm and a second spring arm;
   each of the first and second spring arms is associated with a holding portion;
   the locking element is within the housing;
   the first and second spring arms extend from the operating element to a wall of the housing opposite the operating element;
   each of the first and second spring arms are provided with ball joint portions at their respective ends opposite the operating element; and
   each ball joint portion is received in a joint socket on the wall of the housing opposite the operating element.

2. A coupling device according to claim 1, wherein the second spring arm is essentially symmetrical to the first spring arm.

3. A coupling device according to claim 1, wherein the housing has a guide device for the operating element.

4. A coupling device according to claim 1, wherein each spring arm has a pivotable portion.

5. A coupling device according to claim 4, wherein a pivotable portion comprises an arm member that has two ends, with one end on a spring arm and the other end positioned for contact with an interior wall of the housing.

6. A coupling device according to claim 1, wherein the housing has one or more free movement portions in order to receive the holding portion provided on the spring arm upon operation of the operating element.

7. A coupling device according to claim 1, wherein the housing of the coupling device is constructed in one piece or integrally with a pipe or a corrugated pipe.

8. A coupling device comprising:
   a housing; and
   a locking element for receiving a cylindrical connecting element, wherein:
   an operating element for releasing the locking element is accessible by way of an opening in the housing;
   the locking element includes at least one holding portion;
   the locking element includes a first spring arm and a second spring arm;
   each of the first and second spring arms is associated with a holding portion;
   the locking element is within the housing;
   the first and second spring arms extend from the operating element towards a wall of the housing opposite the operating element;
   one of the first and second spring arms is provided with a ball joint portion and the other is provided with a joint socket, and the ball joint portion is received in the joint socket.

9. A coupling device according to claim 8, wherein the second spring arm is essentially symmetrical to the first spring arm.

10. A coupling device according to claim 8, wherein the housing has a guide device for the operating element.

11. A coupling device according to claim 8, wherein each spring arm has a pivotable portion.

12. A coupling device according to claim 11, wherein a pivotable portion comprises an arm member that has two ends, with one end on a spring arm and the other end positioned for contact with an interior wall of the housing.

13. A coupling device according to claim 8, wherein the housing has one or more free movement portions in order to receive the holding portion provided on the spring arm upon operation of the operating element.

14. A coupling device according to claim 8, wherein the housing of the coupling device is constructed in one piece or integrally with a pipe or a corrugated pipe.

15. A coupling device comprising:
   a housing; and
   a locking element for receiving a cylindrical connecting element, wherein:
   an operating element releasing the locking element is accessible by way of an opening in the housing;
   the locking element includes at least one holding portion;
   the locking element includes a first spring arm and a second spring arm;
   each of the first and second spring arms is associated with a holding portion;
   the locking element is within the housing;
   the first and second spring arms extend from the operating element towards a wall of the housing opposite the operating element; and
   one of the first and second spring arms is provided with a joint portion and the other is provided with a joint socket, and the joint portion is received in the joint socket inside the housing.

* * * * *